Figure 1:
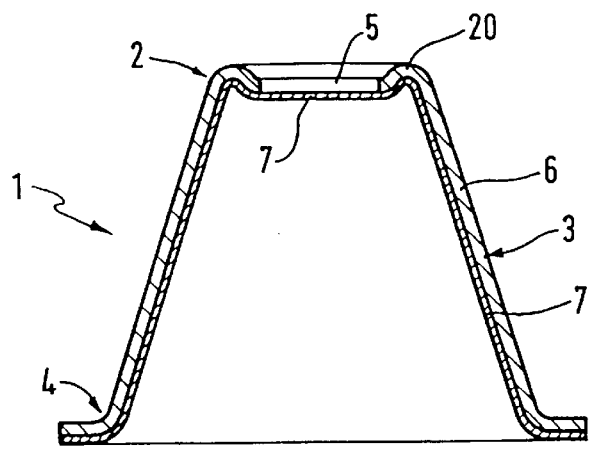

United States Patent
Beerwerth et al.

[19]

[11] Patent Number: 6,156,148
[45] Date of Patent: Dec. 5, 2000

[54] PROCESS FOR PRODUCING A PROTECTIVE CAP FOR AN INFRARED RADIATION THERMOMETER THAT CAN BE INTRODUCED INTO A BODY CAVITY

[75] Inventors: Frank Beerwerth, Runkel-Ennerich; Bernhard Kraus, Braunfels; Katja Honnefeller, Friedrichsdorf; Gerald Görich, Weiterstadt; Walter Zimmermann, Bad Soden, all of Germany

[73] Assignee: BRAUN GmbH, Kronberg, Germany

[21] Appl. No.: 09/117,723

[22] PCT Filed: Feb. 5, 1997

[86] PCT No.: PCT/EP97/00505

§ 371 Date: Aug. 5, 1998

§ 102(e) Date: Aug. 5, 1998

[87] PCT Pub. No.: WO97/29350

PCT Pub. Date: Aug. 14, 1997

[30] Foreign Application Priority Data

Feb. 6, 1996 [DE] Germany ............................ 196 04 200

[51] Int. Cl.$^7$ ................ B32B 21/00; G01K 1/08
[52] U.S. Cl. ............... 156/256; 374/9; 374/163; 600/474; 600/549; 156/108
[58] Field of Search ..................... 156/100, 256, 156/108; 374/163, 9; 600/549, 474

[56] References Cited

U.S. PATENT DOCUMENTS 4,911,559  3/1990  Meyst et al. .
5,088,834  2/1992  Howe et al. .

FOREIGN PATENT DOCUMENTS 0201790  11/1986  European Pat. Off. .
0419100   3/1991  European Pat. Off. .
0472490   2/1992  European Pat. Off. .
0589212   3/1994  European Pat. Off. .
0637430   2/1995  European Pat. Off. .

*Primary Examiner*—Francis J. Lorin
*Attorney, Agent, or Firm*—Hopgood, Calimafde, Kalil & Judlowe

[57] ABSTRACT

The invention is directed to a process for manufacturing a protective cap which is adapted to be fitted to an ear canal temperature measurement probe of an infrared radiation thermometer and to be introduced into a body cavity. The protective cap (1) is formed of a base body (3) of plastic material having its one end open and its opposite end closed by a window film (7) transparent to infrared radiation. In a first step of the process, at least one hole (5) is made in a sheet-, film-, web- or plate-shaped base body material intended to form the base body (3). In a second step of the process, the perforated base body material (6) is covered at least in the area of the hole (5) with a window film (7) fabricated from a plastic material transparent to infrared radiation and joined to the base body material (6) in an immovable manner. Subsequently, this composite body is shaped into a protective cap (1) in a third step and, where applicable, said cap is processed to the final dimensions of the protective cap (1) in a fourth step. This enables a plurality of protective caps (1) to be manufactured as on a conveyor line very simply and in no time.

27 Claims, 1 Drawing Sheet

PROCESS FOR PRODUCING A PROTECTIVE CAP FOR AN INFRARED RADIATION THERMOMETER THAT CAN BE INTRODUCED INTO A BODY CAVITY

This invention relates to processes for manufacturing a funnel-shaped protective cap which is adapted to be fitted to an ear canal temperature measurement probe of an infrared radiation thermometer and to be introduced into a body cavity and includes a tubular base body of plastic material having its one end open and its opposite end closed by a window film transparent to infrared radiation.

Among other approaches, body temperature is measured using electronic radiation thermometers. Typically, such a radiation thermometer includes a housing with a window admitting radiation, an internal optic system and an infrared sensor that is associated with an evaluation unit. The window admitting radiation serves to close off the interior of the housing of the radiation thermometer, thereby protecting the optic system and the sensor from contamination and destruction. To determine a person's body temperature, the forward end of the thermometer is directed into the ear. The infrared radiation emitted by the tympanic membrane and by the ear canal enters the thermometer through the window and is incident, via the optic system or an optical waveguide and an interference filter, on the infrared sensor. The increase in temperature produced in the sensor results in an electrical output voltage from which the radiation temperature can be determined by means of an evaluation unit.

As an additional protection, protective caps of the type initially referred to are seated onto the end of the thermometer as by fitting them over the ear canal probe of a tympanic thermometer that is sensitive to infrared radiation; such protective caps are described, for example, in EP-B-0 201 790. These protective caps not only serve the function of protecting the infrared transmitting window, but also are intended to prevent the transmission of diseases to the user, which is accomplished in that a new protective cap is installed prior to each temperature being taken or prior to each temperature measurement in cases where different persons are involved. The protective cap described in EP-B-0 201 790 includes an infrared transmitting membrane made of polypropylene or polyethylene. The portion carrying the membrane is an injection-molded part.

Because such protective caps are typically disposable items which are removed and disposed of following use in order to install a new protective cap on the thermometer for the next temperature measurement, it is desirable that such protective caps be low-cost items. A significant cost factor in the manufacture of such protective caps is not the cost of the material but rather the manufacturing process. Conventionally, such protective caps are produced by injection-molding a base body to a tubular shape from plastic and subsequently closing the one open end of this base body with a window film that is transparent to infrared radiation. U.S. Pat. No. 5,293,862 makes reference to such manufacture of a protective cap by means of injection-molding.

From EP-A-0 589 212 and EP-A-0 637 430 flat protective caps are known which comprise two or three layers of film lying flat one upon the other. A hole is provided in the center of the first film. The second film is transparent to infrared radiation and welded to the first film in the corners. It is only when a user fits such a flat protective cap over the ear canal probe of a radiation thermometer by using the end of the ear canal probe to urge the second infrared transmitting film through the hole in the first film that the flat protective cap is given a funnel shape to fit the external shape of the ear canal probe. When the protective cap is removed from the ear canal probe following measurement, its funnel shape is again lost.

Proceeding from the state of the art referred to in the foregoing and the known manufacturing processes for such protective caps, it is an object of the present invention to provide processes enabling funnel-shaped protective caps to be manufactured economically from different materials.

The foregoing object is attained by the processes incorporating the features set forth in claims 1 or 21.

In the process of the present invention according to claim 1, the base body is fabricated from a base body material of sheet, web or plate shape and provided with a window film. Such materials may be fed to a production line continuously to subsequently undergo punching, forming and cutting operations. This double-layer structure enables the window to be formed while at the same time provision is made for thermal insulation on the outer layer. With such a process, a plurality of protective caps can be produced continuously on the line in no time. No allowance need be made for cooling as is known when injection-molding such parts. Moreover, the base body material may be covered completely with a film of foamed plastic or some other plastic film provided with air inclusions, with the window area being subsequently thinned by hot stamping or pressing to improve its transparency to infrared radiation.

In the event of web-type material being utilized which exhibits a certain flexibility, this web material may be unwound from a supply roll (claim 5), preferably in the form of a continuous web held on the supply roll (claim 7). However, the possibility also exists to unload the material, at least that for the base body, from a stack and feed it continuously to the subsequent processing stations.

According to the first approach for manufacturing protective caps, a first step comprises providing the base body material with holes by punching (claim 2). These holes are associated with the open end of the base body to be formed from which the protective cap is manufactured.

As described initially with reference to the state of the art, such protective caps have a film-type window which desirably is as thin as possible and transparent to radiation in the relevant measurement range. After the holes are punched in the base body material (claim 2), the windows are formed in a second step which comprises feeding a window film preferably of a thickness in the range from 20 to 50 $\mu$m (claim 9), and joining the perforated base body material and the window film together by welding (claim 3) and/or adhesive bonding (claim 4).

It is not absolutely necessary to use a large surface area for joining the base body material and the film material together, but rather, it may be sufficient to perform at least this joint in the edge area of the hole. It is essential that the film be of like thickness for all protective caps; any differences in thickness may affect the measurement result using a radiation thermometer on which such a protective cap with a window film is installed. Particularly where web-shaped film material is fed, uniform smoothing and defined application of the film to the base body material is rendered possible because it involves the use of materials having a relatively large surface area which are joined one upon the other in one plane.

Apparently, it is not only possible for the holes to be provided in the base body material in one row but preferably in a field arrangement in which several rows of holes are punched perpendicularly to the direction of production flow. As base body material preferably a film with a thickness in the range from 0.4 to 0.8 mm (claim 8) is fed. Preferably, the base body material is a plastic material, in particular polyethylene or polystyrene (claim 11).

After the base body material and the window film are joined together in the second step, the feed stock thus prepared is fed to a third processing station in which the protective cap is formed by deep drawing (claim 13), enabling a complete field of deep-drawn forms to be produced at a time in accordance with the field distribution of the punched holes, each deep-drawn form being associated with a respective window. Finally, the still attached deep drawn field of base bodies is subjected to a fourth processing step in which the individual protective caps are processed to their final dimensions as by punching them out.

Experience has shown that the manufacturing process can be expedited by providing for an inspection operation after forming the feed stock, yet prior to processing it to final dimensions. This applies particularly if in the production line only one continuously punched row of holes is made in the web- or plate-shaped material. Considering that a critical process step is the forming of the feed stock after the base body and the film are joined together, in which effects on quality cannot be ruled out, processing of the feed stock to final dimensions is preceded by an inspection operation in which the transmissive properties of the film material are checked in a gauging station and such film material is marked that has failed to meet the requisite transmissive properties within the scope of the measurement accuracy to be satisfied. In the manufacturing process it is then not necessary to process to final dimensions such preforms which have failed to satisfy the quality requirements, instead they are precluded from the final processing step (claims 17 and 18).

The approach referred to in the foregoing not only enables film-type or plate-type materials to be processed but also thermally insulative materials are equally well suitable (claim 14) as, for example, foamed plastic materials (claim 15). Experience has shown that protective caps made of materials with good heat insulating properties, which include foamed plastic materials, contribute to enabling measurement errors occurring due to external thermal effects during body temperature measurement to be avoided largely. It is precisely that portion of the base body which is in the immediate vicinity of the window and hence comes into intimate contact with the wall of the body cavity as, for example, the ear canal, that is insulated in such fashion that in this particular portion the transfer of heat to the infrared optic system is reduced or maintained at such a low level as to be negligible as regards its effect on the temperature measurement. Because this protective cap reduces the input of heat, the cooling of, for instance, the ear canal is also diminished at the same time. This has the further effect that by reason of the diminished cooling effect on the ear the user has the impression that the thermometer with this protective cap is warmer and hence substantially less discomforting. Further, this thermally insulative means may be of a soft configuration, being more pleasant in the ear than a firm, non-pliant material or a protective cap sheathed with such a material. A further particular advantage of such a protective cap is to use it in conjunction with a clinical thermometer having a small temperature measurement probe. A clinical thermometer with a small temperature measurement probe is suitable for taking both an adult's and a child's temperature if this protective cap of thermally insulating material is made available in at least two sizes. However, such a protective cap may also be fabricated from a particularly soft, thermally insulating and hence elastic material which conforms itself to both an adult's and a child's ear canal, in spite of the size difference.

Thermally insulating material in the form of foamed plastic has the advantage that the thermally insulative properties can be set, particularly by suitably selecting the type of foamed plastic in terms of pore size and hence percentage of air as well as in terms of foamed plastic with open or closed pores (foamed plastic with closed pores being preferable). Still further, it is possible to deform foamed plastic materials by stamping and particularly by the application of heat irreversibly, so that in particular margin areas of this base body can be thinned (for example, in the area of the hole to which the film is applied) or thickened in the manner of a bead (for instance, at the lower rim of the disposable cap opposite the window opening). (See claims 16, 19 and 20).

While particularly in the foregoing there was described the process variant for the manufacture of a protective cap starting from a base body material and a film material which are joined together, an alternative approach for the continuous manufacture of protective caps is to proceed from one single material from which the protective cap with the film-type window is fabricated (claim 21). The process steps of a stamping operation as indicated previously in the description of the first approach can be utilized for this purpose, starting from an easily workable base body material which, suitably thinned, is moreover transmissive to infrared radiation, and working it by stamping in such fashion that the base body and the window film are formed from one integral body.

Thinning the starting material in the window area is preferably performed in several individual forming steps involving a hot or cold stamping operation (claim 22). Thinning the material in the area of the window film has the effect that potential natural emissions are avoided by a reduced film thickness, which otherwise could adversely affect the radiation components incident on the sensing device of a radiation thermometer and attributable to the thermal radiation emitted by the body.

Within the scope of this latter approach, the operation of thinning that area of the starting material that is associated with the window film to final dimensions is preferably performed in the deep-drawing step (claim 23), so that it can be made sure that the requisite film thicknesses are maintained which could be affected otherwise by this final deep-drawing step if the film was already stamped to its final dimensions in a prior operation.

For those in the art it will be apparent that also the second approach (according to claims 21 to 23) enables a variety of operations to be performed within the scope of the process as described in the foregoing with reference to the first approach (claims 1 to 20).

Figure 2A:
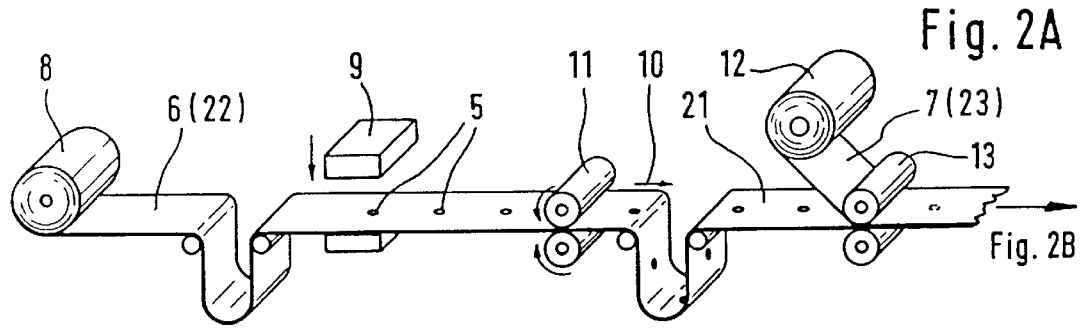
Figure 2B:
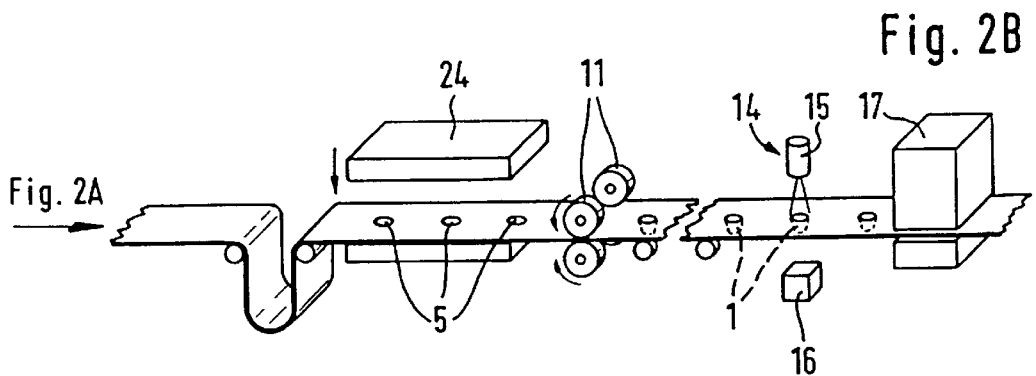
Figure 3:
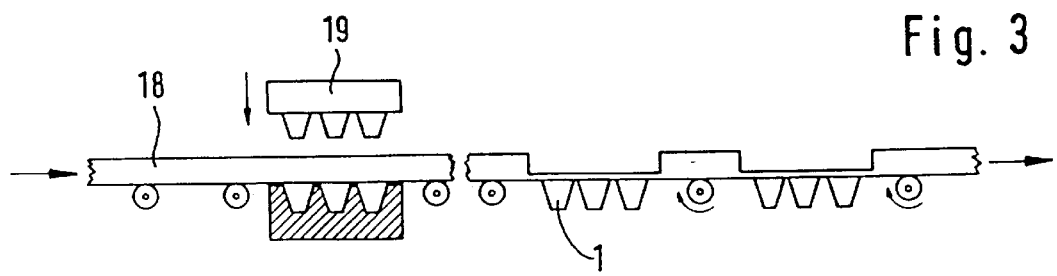

Further details and features of the processes of the present invention will be described in the following with reference to the accompanying drawings. In the drawings, FIG. 1 is a schematic cross sectional view of a protective cap with window film;

FIG. 2A and FIG. 2B illustrate schematically a process sequence for the manufacture of a protective cap similar to the one shown in FIG. 1; and FIG. 3 illustrates schematically part of a production line for the manufacture of protective caps by stamping a starting material.

For sanitary reasons, a protective cap 1 is installed on a forward end of an infrared radiation thermometer suitable for use as a clinical thermometer, for example, which cap, in addition to providing for protection against contamination of the entrance window of the radiation thermometer, also serves a thermal insulating function. To take a person's body temperature, the protective cap 1 is mounted on the radiation thermometer (not shown), its forward end 2 being then introduced as into an ear canal (not shown) in order to measure the infrared radiation emitted.

The protective cap has a tubular base body 3 which is open at its lower end 4. At its upper or forward end 2, a hole or aperture 5 is provided which forms a window admitting radiation and is advantageously surrounded by a stiffening ring 20.

As becomes apparent from the cross sectional view of FIG. 1, the protective cap 1 is a double-layer structure comprising a base body material 6 and a film material 7. While the base body material 6 forms the relatively dimensionally stable base body 3, in the representation of FIG. 1 the film material 7 is fitted over the entire inner surface of the base body 3, being held in stretched fashion over the hole 5 to thus form the window admitting radiation.

For economy of continuous manufacture of the protective cap 1 in a production line, a suitable web 22 of base body material 6 is unwound from a supply roll 8 and fed to a punching station 9, as shown in FIG. 2A. The base body material fed is preferably a film of polyethylene or polystyrene of a thickness in the range from 0.4 to 0.8 mm. The punching station 9 punches holes 5 continuously in the web-shaped base body material, the holes 5 being those that in the finished protective cap 1 provide the holes 5 representing the radiation entrance windows.

While the holes 5 in the base body material 6 shown in FIG. 2A are spaced from each other by a relatively large distance, it should be apparent that these holes may also be punched at very short intervals, preferably producing several such holes simultaneously during a punching operation, or alternatively several rows of such holes 5 perpendicularly to the direction of production flow (indicated by the arrow 10). Along the production line several drive rolls 11 as illustrated schematically in FIGS. 2A and 2B 11 may be provided, which in part, that is, at the end of the production line, engage only the edge of the material 6.

After the holes are punched in the first process step, a second station follows where in a second step a web 23 of a thin window film 7 unwound from a second supply roll 12 is placed onto the upper side 21 of the base body material 6. As window film a film of polyethylene or polypropylene, preferably of a thickness of 20 to 50 μm, is utilized. The film material 7 is urged against the base body material by pressure rolls 13 and welded or adhesively bonded thereto with the application of heat. This composite body comprising the base body and film materials 6, 7 is then fed to a deep drawing station 24 illustrated schematically in FIG. 2B, which deep draws in the area of each hole 5 a protective cap formed to a shape according to FIG. 1.

Subsequent to deep drawing, this third process step is followed by a fourth step in which the web 22 is inspected in a fourth processing station. To this effect, the fourth processing station 14 includes an infrared radiation source 15 whose radiation, in the wavelength range relevant for the temperature measurement, is directed to each aperture 5 covered with the film material 7. Beneath the web 22, a sensor 16 is arranged which detects the transmitted radiation components. In the event of the transmissive properties of the window film 7 failing to satisfy the quality requirements, such a protective cap 1 is marked and not further processed in the final processing station 17 in which the protective cap 1 is severed from the web and processed to final dimensions.

While in the process sequence of FIGS. 2A to 2B the film material 7 is applied to that side of the base body material 6 that forms the inside of the protective cap 1 as is illustrated in FIG. 1, it will be understood that the film material 7 forming the window 7 may also be applied to the opposite side, that is, in FIGS. 2A and 2B to the underside of the base body material 6 which in a subsequent stage forms the outside of the protective cap 1, so that a smooth outer surface is obtained.

While FIGS. 2A and 2B show a process sequence in which the protective cap is formed from two web materials 22, 23, that is, the base body material 6 and the film material 7, FIG. 3 shows schematically a process sequence for the continuous manufacture of protective caps, wherein according to the second invention only one single web material is necessary. According to FIG. 3, a base body material 18 is fed which has good stamping and/or forming properties. The material involved is in particular polyethylene which, on the one hand, is suitable for forming a relatively dimensionally stable base body and, on the other hand, is also suitable for transmitting infrared radiation in the range relevant for a body temperature measurement. This base body material 18 is then directly fed to a stamping station 19 in which the material is formed preferably in several successive stamping steps, producing at the output end of the stamping station individual protective caps 1 formed out of the base body material 18, with the forward end 2 of the protective cap 1 in which the window 7 is formed facing down. In the stamping station 19, the protective cap 1 can be formed to have wall areas differing in thickness in accordance with the specifications for the protective cap 1, the starting material 18 being formed to a very thin film in the area of the window 7 to provide the window film 7.

It will be apparent that in the stamping station 19 the starting material 18 can first be profiled only by stamping which may also involve several steps. The tubular or funnel-shaped form of the protective cap according to FIG. 1 is then obtained in a subsequent deep drawing step as explained with reference to FIG. 2B. According to FIG. 2B, such a deep drawing step is followed by an inspection operation and an operation in which the individual protective caps are processed to final dimensions.

We claim:

1. A process for manufacturing a funnel-shaped protective cap (1) which is adapted to be fitted to an ear canal temperature measurement probe of an infrared radiation thermometer and includes a tubular base body (3) made of plastic material having its one end open and its opposite end closed by a window film (7) transparent to infrared radiation, characterized in that in a first step at least one aperture (5) is made in a sheet-, film-, web- or plate-shaped base body material (6) to form a perforated base body material (6), covering and immovably joining the perforated base body material (6) at least in the area of the aperture (5) with a window film (7) fabricated from a plastic material transparent to infrared radiation, shaping the composite body into a protective cap (1) having an opening (4) opposite said aperture (5), and, where applicable, processing the protective cap (1) to final dimensions.

2. The process as claimed in claim 1, characterized in that the hole (5) is punched into the base body material (6).

3. The process as claimed in claim 1, characterized in that the perforated base body material (6) and the window film (7) are joined together in an immovable manner by welding.

4. The process as claimed in claim 1, characterized in that the perforated base body material (6) and the window film (7) are joined together in an immovable manner by adhesive bonding.

5. The process as claimed in claim 1, characterized in that the base body material (6) is unwound from a first supply roll (8) and subsequently punched in a first step.

6. The process as claimed in claim 1, characterized in that the window film (7) is unwound from a second supply roll (12) and joined to the perforated base body material (6) in a second step.

7. The process as claimed in claim 5, characterized in that the base body material (6) is fed as a web, with a sequence of holes (5) being made in the first step, and that following the forming operation the protective caps thus fabricated are severed from the web in a further step.

8. The process as claimed in claim 1, characterized in that the base body material (6) used is a film (7) of a thickness in the range from 0.4 to 0.8 mm.

9. The process as claimed in claim 1, characterized in that a window film (7) with a thickness in the range from 20 to 50 $\mu$m is used.

10. The process as claimed in claim 1, characterized in that the window film (7) is applied to the upper side (21) of the base body material (6) to form an inside coating on the protective cap following the forming operation.

11. The process as claimed in claim 1, characterized in that the base body material (6) utilized is a film made of plastic material, in particular polyethylene or polystyrene.

12. The process as claimed in claim 1, characterized in that the window film (7) used is made of a material selected from the group consisting of polyethylene and polypropylene.

13. The process as claimed in claim 1, characterized in that the protective cap (1) is formed by deep-drawing in a third step.

14. The process as claimed in claim 1, characterized in that the base body material (6) utilized is a thermally insulating material.

15. The process as claimed in claim 14, characterized in that the thermally insulating material utilized is foamed plastic.

16. The process as claimed in claim 1, characterized in that that the forming step is a stamping operation.

17. The process as claimed in claim 1, characterized in that the step of processing to final dimensions is preceded by an inspection operation.

18. The process as claimed in claim 17, characterized in that the window film (7) is checked for its transmissivity in the infrared radiation range relevant for the temperature measurement.

19. The process as claimed in claim 1, characterized in that an annular stiffening (20) is formed along the edge of the hole covered with the window film.

20. The process as claimed in claim 19, characterized in that the annular stiffening (20) is formed during the forming step.

21. A process for manufacturing a funnel-shaped protective cap (1) which is adapted to be fitted to an ear canal temperature measurement probe of an infrared radiation thermometer and includes a tubular base body (3) made of plastic material having its one end open and its opposite end closed by a window film (7) transparent to infrared radiation, comprising the following steps:

thinning a sheet-, film-, web- or plate-shaped base body material (6) intended to form the base body (3) by stamping in a predetermined area associated with the window film (7) to be formed, shaping the base body material (6) into a protective cap (1) by a deep-drawing or stamping operation, and, where applicable, processing the protective cap (1) to final dimensions.

22. The process as claimed in claim 21, characterized in that the predetermined area is thinned in several stamping steps.

23. The process as claimed in claim 22, characterized in that the operation of thinning the predetermined area to the final thickness of the window film (7) is performed as part of the deep-drawing or stamping operations.

24. The process as claimed in claim 5, characterized in that the window film (7) is unwound from a second supply roll (12) and joined to the perforated base body material (6) in a second step.

25. The process as claimed in claim 6, characterized in that the window film (7) is applied to the upper side (21) of the base body material (6) to form an inside coating on the protective cap following the forming operation.

26. The process as claimed in claim 14, characterized in that the thermally insulating material utilized is foamed plastic.

27. The process as claimed in claim 15, characterized in that the thermally insulating material utilized is foamed plastic.

* * * * *